United States Patent
Spaggiari

(10) Patent No.: US 7,586,227 B2
(45) Date of Patent: Sep. 8, 2009

(54) ELECTRIC MOTOR FOR ELECTRIC FAN AND ASSEMBLY METHOD THEREFOR

(75) Inventor: Alessandro Spaggiari, Correggio (IT)

(73) Assignee: Spal Automotive S.r.l., Correggio (Reggio Emilia) (IT)

( * ) Notice: Subject to any disclaimer, the term of this patent is extended or adjusted under 35 U.S.C. 154(b) by 579 days.

(21) Appl. No.: 10/573,186

(22) PCT Filed: Sep. 28, 2004

(86) PCT No.: PCT/IB2004/003186

§ 371 (c)(1), (2), (4) Date: Mar. 23, 2006

(87) PCT Pub. No.: WO2005/034309

PCT Pub. Date: Apr. 14, 2005

(65) Prior Publication Data

US 2007/0052309 A1    Mar. 8, 2007

(30) Foreign Application Priority Data

Sep. 30, 2003 (IT) .......................... BO2003A0563

(51) Int. Cl.
H02K 5/00 (2006.01)
(52) U.S. Cl. .............................. 310/85; 310/89; 277/630
(58) Field of Classification Search ............. 310/85–89; 277/590, 594, 596, 630
See application file for complete search history.

(56) References Cited

U.S. PATENT DOCUMENTS

| 1,472,133 | A | * | 10/1923 | Oven .......................... 277/598 |
| 1,539,222 | A | * | 5/1925 | Turner ......................... 277/630 |
| 1,918,478 | A | * | 7/1933 | Laycock ....................... 277/630 |
| 5,616,973 | A | * | 4/1997 | Khazanov et al. ............. 310/54 |
| 5,767,596 | A | | 6/1998 | Stark et al. |
| 6,150,744 | A | | 11/2000 | Onishi |
| 6,198,189 | B1 | * | 3/2001 | Takahashi et al. ............. 310/89 |

(Continued)

FOREIGN PATENT DOCUMENTS

DE    42 35 437 C1    9/1993

(Continued)

*Primary Examiner*—Dang D Le
(74) *Attorney, Agent, or Firm*—The Nath Law Group; Jerald L. Meyer; Jiaxiao Zhang

(57) ABSTRACT

The invention relates to an electric motor for electric fans having a casing with at least a lid with a hermetic seal and a method for assembly of the motor. The motor (1) has a casing (2) consisting of a cup-shaped part (5) and a lid (6) and an O-ring seal (7) inserted between them, the seal (7) comprising retaining means (8) so that it remains applied to one of the elements, either the lid (6) or the cup-shaped part (5). The method for assembly includes the steps of inserting an O-ring seal (7) in a seat (10) in the lid (6) or in the cup-shaped part (5), the O-ring seal (7) having retaining rings (11); and inserting each retaining ring (11) on a respective fixing pin (15) present in the lid (6) or in the cup-shaped part (5), so that the seal (7) remains positioned in the seat (10) applied to one of the elements, either the lid (6) or the cup-shaped part (5).

10 Claims, 1 Drawing Sheet

U.S. PATENT DOCUMENTS

| | | | |
|---|---|---|---|
| 6,257,592 B1 * | 7/2001 | Hashizawa et al. | 277/596 |
| 6,485,028 B1 * | 11/2002 | Smith | 277/598 |
| 6,779,800 B2 * | 8/2004 | Udagawa | 277/592 |
| 2003/0098548 A1 | 5/2003 | Boone et al. | |
| 2005/0162026 A1 * | 7/2005 | McCain et al. | 310/88 |
| 2008/0284112 A1 * | 11/2008 | Koch et al. | 277/590 |

FOREIGN PATENT DOCUMENTS

| | | |
|---|---|---|
| EP | 0 500 282 A1 | 8/1992 |
| EP | 1 045 174 A2 | 10/2000 |
| EP | 1 191 262 A1 | 3/2002 |

* cited by examiner

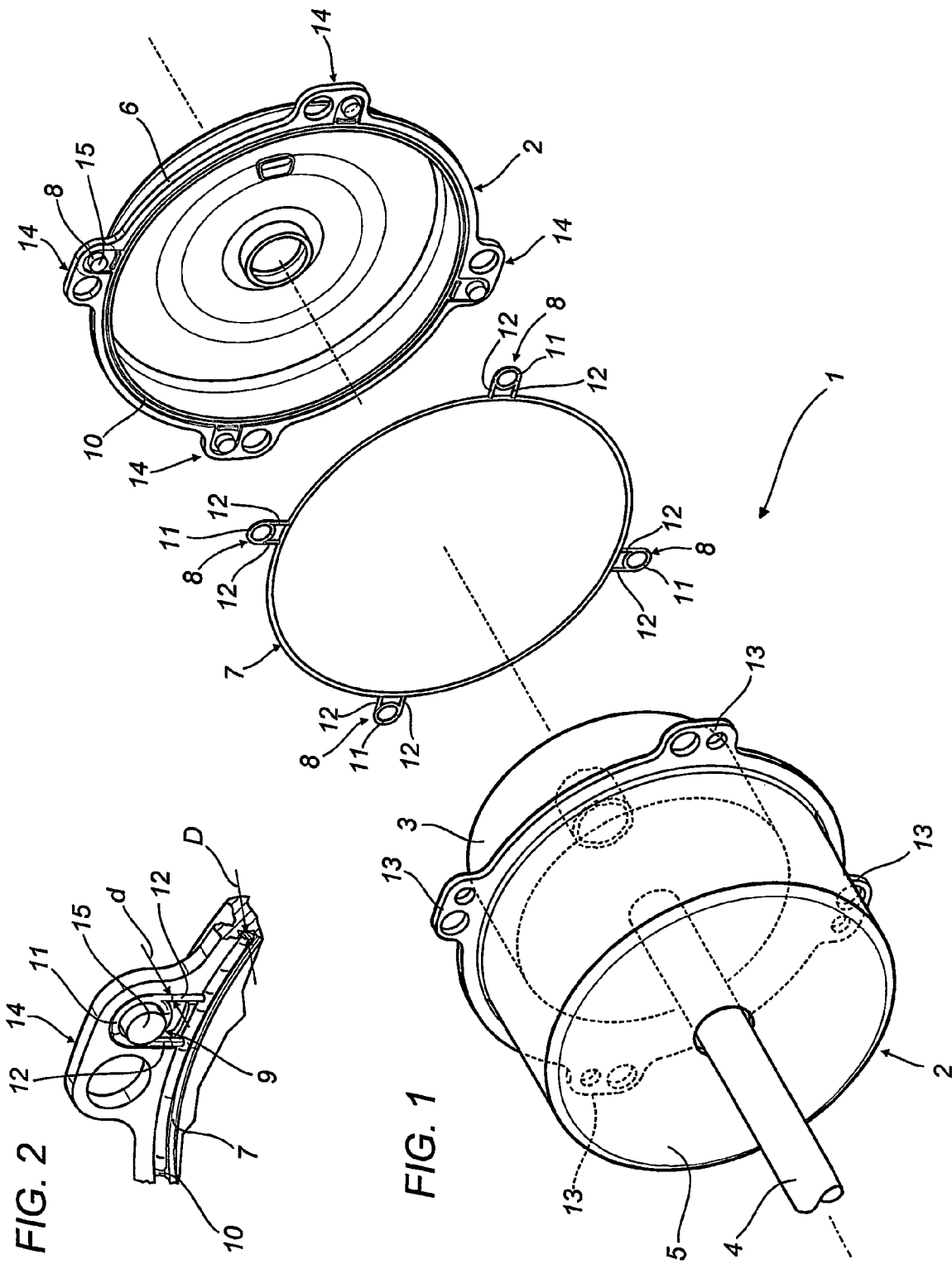

ELECTRIC MOTOR FOR ELECTRIC FAN AND ASSEMBLY METHOD THEREFOR

TECHNICAL FIELD

The present invention relates to an electric motor for electric fans having a casing with at least a lid with a hermetic seal and a method for assembly of the motor. In particular, the present invention relates to a casing for an electric motor comprising at least a lid and a housing, having an intermediate "O-ring" type seal with characteristics which facilitate assembly.

The present invention also relates to a method for assembly of the casing of an electric motor characterised by facilitated assembly steps.

The following description refers to an electric motor, but it must be considered that the present invention may also be applied to an electric generator, for example an alternator or a dynamo.

BACKGROUND ART

Generally speaking, an electric machine such as an electric motor or a dynamo comprises a stator, a rotor mounted on a shaft and a casing which has supports for the rotor shaft.

To mount the stator and the rotor in the casing, the casing must be separated into at least two parts which can be put together.

An example of an electric machine and of a method for its production is known from U.S. Pat. No. 5,767,596.

Electric motors that are water- and humidity-proof are also known, especially in the sector of electric fans for motor vehicles.

Due to the environmental conditions and the position of electric fans close to heat sources and/or cold sources, the humidity in the environment may penetrate the motor casing and following temperature variations it may be transformed into liquids, creating electrical problems for the motor.

Starting with the typical construction of the motor casing in two parts, of which one part is cup-shaped and the other part is lid-shaped, attempts were made to produce a waterproof casing for electric motors, inserting a seal between the above-mentioned two parts.

However, this type of assembly is not without disadvantages: indeed, the insertion of a seal complicates the structure of the motor.

In addition, for motor casing sealing to be effective, the seal must be correctly positioned between the two parts, which must also have suitable housings for the seal.

DISCLOSURE OF THE INVENTION

One aim of the present invention is to provide an electric motor for an electric fan having a casing of an improved type with good water- and humidity-proof characteristics.

Another aim of the present invention is to provide an electric motor for an electric fan having a casing which is simple and economical to produce and assemble.

According to one aspect of it, the present invention provides an electric motor for an electric fan as defined in claim 1.

Another aim of the present invention is to provide a method for assembly of an electric motor including a step of connecting a seal to one of the parts of the motor casing so as to facilitate assembly of the motor.

According to another aspect of it, the present invention provides a method for assembly of an electric motor for an electric fan as defined in claim 10.

The dependent claims refer to preferred, advantageous embodiments of the invention.

BRIEF DESCRIPTION OF THE DRAWINGS

The accompanying drawings illustrate embodiments of the present invention without limiting the scope of its application, and in which:

FIG. 1 is a perspective exploded view of the electric motor according to the present invention; and FIG. 2 is a detail of the electric motor illustrated in FIG. 1.

DESCRIPTION OF A PREFERRED EMBODIMENT OF THE INVENTION

With reference to the accompanying drawings, the electric motor 1 basically comprises a casing 2 in which there is a stator (not illustrated) and a rotor 3 mounted on a shaft 4.

The following description refers to an electric motor, but it must be considered that the present invention may also relate to other types of similar electric machines, for example current generators such as alternators.

The casing 2 in turn comprises a cup-shaped part 5 and a lid 6 connected to one another by connecting devices of the known type and therefore not illustrated in detail.

To create a good seal against liquids and humidity, a static seal 7 is inserted between the cup-shaped part 5 and the lid 6.

The static seal 7 may be any type of elastic seal which, when inserted between the cup-shaped part 5 and the lid 6 is subject to slight compression by the respective surfaces operating in conjunction with one another between the two parts 5, 6 of the casing 2 and so provides a seal against external agents (liquids, dust, etc.).

The seal 7 also comprises retaining means 8 which allow the seal 7 to be applied to and held on one of the two parts 5, 6 of the casing 2.

For this purpose, the part 5, 6 in question also has fixing means 9 which operate in conjunction with the retaining means 8 to temporarily make the seal 7 integral with one of the two parts 5, 6.

In the embodiment illustrated, the seal 7 is an O-ring seal, made of an elastomeric material, or the like, operating frontally between the cup-shaped part 5 and the lid 6 and inserted in a seat 10 made in the lid 6.

As is known, O-ring type seals, when operating frontally, are slightly compressed, causing the seal to expand sideways. Therefore, the seal seat must be wide enough to allow this expansion.

The retaining means 8 comprise at least two retaining rings 11 with diameter smaller than the diameter of the seal 7. The retaining rings 11 are connected to the seal 7 by short connecting sections 12 and are positioned at regular intervals along the circumference.

The retaining rings 11 hold the seal 7 extended and adhering in the seat 10 and it is important that the rings 11 are not too close to one another, to prevent them from interfering with the normal seal 7 deformations.

The rings 11 are preferably integral with the seal 7 and are made of the same elastomeric material as the seal.

The rings 11 are on the outer side of the O-ring seal and are close to the outer edge of the casing 2. In the embodiment illustrated in the accompanying drawings, the rings 11 are close to the connecting devices for the cup-shaped part 5 and the lid 6. Therefore, the latter respectively have protrusions 13, 14 in which the connecting devices, the seats for the rings 11 and the fixing means 9 are located.

In the embodiment illustrated in the accompanying drawings the retaining rings 11 are four devices set at 90 degrees to one another and each ring 11 is connected to the O-ring seal by two connecting sections 12.

The latter, together with each ring 11, are made with a smaller diameter "d", or are thinner than, the diameter or thickness "D" of the seal 7, so that they do not interfere with seal 7 compression and therefore with its effective sealing.

Each ring 11 is inserted about a fixing pin 15 which constitutes the fixing means 9 and is on the lid 6 in the protrusions 14. Obviously, the seat 10 for the O-ring seal and the fixing pins 15 for the rings 11 may alternatively be on the cup-shaped part 5 in the protrusions 13.

The fixing pin 15 may have a diameter slightly larger than that of the ring 11 internal hole, the ring remaining attached to the pin 15 partly thanks to the elasticity of the material the ring 11 is made of.

The fixing pin 15 may also be made with a truncated cone profile, or it may have a shallow circumferential cavity (not illustrated).

Whatever the case, the ring 11, elastically deforming on the fixing pin 15, remains attached to the fixing pin and as a result the entire O-ring seal is held in the seat 10.

The method for assembly of the casing of an electric motor disclosed comprises the steps of inserting the O-ring seal in the seat 10 in the lid 6 or in the cup-shaped part 5, and inserting each retaining ring 11 on each fixing pin 15 in the lid 6 or in the cup-shaped part 5, so that the seal 7 remains positioned in the seat 10 applied to one of the elements, either the lid 6 or the cup-shaped part 5. Then the components 3 inside the casing 2 can be fitted and the lid 6 can be connected to the cup-shaped part 5.

The present invention brings important advantages.

Thanks to the retaining means 8 on the seal 7, the latter can easily be applied to the lid 6 or to the cup-shaped part 5, making assembly of the motor 1 simpler.

The retaining means 8 in the form of rings 11 on the O-ring seal and the fixing pins 15 on the lid 6 or on the cup-shaped part 5 are simple to produce and effectively secure the O-ring seal.

Even the costs for production of the retaining means 8 are contained thanks to the simplicity of the components.

The invention described can be subject to modifications and variations without thereby departing from the scope of the inventive concept, as defined in the claims herein.

Moreover, all the details of the invention may be substituted by technically equivalent elements.

LIST OF REFERENCE CHARACTERS 1 electric motor
2 casing
3 rotor
4 rotor 3 shaft
5 cup-shaped part
6 lid
7 seal
8 retaining means
9 fixing means
10 seal 7 seat
11 retaining rings
12 connecting sections between rings 11 and seal 7
13, 14 protrusions on elements 5, 6
15 fixing pin
d diameter or thickness of the retaining rings 11 and sections 12
D diameter or thickness of the seal 7.

The invention claimed is:

1. An electric motor comprising:
a casing having a shaft on which a stator and a rotor are mounted, the casing comprising
a cup-shaped part,
a lid, wherein the cup-shaped part and the lid are connected to one another with removable connecting devices, and
a static seal inserted between the cup-shaped part and the lid, the static seal comprising
an O-ring seal positioned in a seat in the lid or in the cup-shaped part, and
retaining means for maintaining the application of the static seal to one of the elements, either the lid or the cup-shaped part, wherein the retaining means are rings, each ring connected to the static seal by two sections.

2. The electric motor according to claim 1, wherein the retaining means operate in conjunction with fixing means present in the lid or in the cup-shaped part.

3. The electric motor according to claim 2, wherein the fixing means are pins which have a diameter slightly larger than that of the ring internal hole, so that the ring adheres to the pin due to the elasticity of the material used to make the ring.

4. The electric motor according to claim 2, wherein the fixing means are pins which have a truncated cone profile or a circumferential cavity with a diameter slightly larger than that of the ring internal hole, so that the ring adheres to the pin due to the elasticity of the material used to make the ring.

5. The electric motor according to claim 2, wherein the rings are close to the devices connecting the cup-shaped part and the lid, the latter respectively having protrusions in which the connecting devices, the rings and the pins are located.

6. The electric motor according to claim 1, wherein the rings are integral with the static seal and are made of the same elastomeric material.

7. The electric motor according to claim 1, wherein the rings are connected to the static seal by sections and the rings and the sections are made with a diameter (d) smaller than, or are thinner than, the diameter or the thickness (D) of the static seal, so that they do not interfere with static seal compression.

8. An electric motor comprising:
a casing having a shaft on which a stator and a rotor are mounted, the casing comprising
a cup-shaped part,
a lid, wherein the cup-shaped part and the lid are connected to one another with removable connecting devices, and
a static seal inserted between the cup-shaped part and the lid, the static seal comprising
an O-ring seal positioned in a seat in the lid or in the cup-shaped part, and
retaining means for maintaining the application of the static seal to one of the elements, either the lid or the cup-shaped part, wherein
the retaining means are rings, each ring connected to the static seal by two sections, wherein
the retaining means operate in conjunction with fixing means present in the lid or in the cup-shaped part, wherein the fixing means are pins.

9. An electric motor comprising:
a casing having a shaft on which a stator and a rotor are mounted, the casing comprising a cup-shaped part, a lid, wherein the cup-shaped part and the lid are connected to one another with removable connecting devices, and a static seal inserted between the cup-shaped part and the lid, the static seal comprising an O-ring seal positioned in a seat in the lid or in the cup-shaped part, and retaining means for maintaining the application of the static seal to one of the elements, either the lid or the cup-shaped part, wherein the retaining means are rings, each ring connected to the static seal by two sections, wherein the retaining means operate in conjunction with fixing means present in the lid or in the cup-shaped part, wherein the fixing means are pins which have a diameter slightly larger than that of the ring internal hole, so that the ring adheres to the pin due to the elasticity of the material used to make the ring.

10. An electric motor comprising:

a casing having a shaft on which a stator and a rotor are mounted, the casing comprising a cup-shaped part, a lid, wherein the cup-shaped part and the lid are connected to one another with removable connecting devices, and a static seal inserted between the cup-shaped part and the lid, the static seal comprising an O-ring seal positioned in a seat in the lid or in the cup-shaped part, and retaining means for maintaining the application of the static seal to one of the elements, either the lid or the cup-shaped part, wherein the retaining means are rings, each ring connected to the static seal by two sections, wherein the retaining means operate in conjunction with fixing means present in the lid or in the cup-shaped part, wherein the fixing means are pins which have a truncated cone profile or a circumferential cavity with a diameter slightly larger than that of the ring internal hole, so that the ring adheres to the pin thanks to the elasticity of the material used to make the ring.

* * * * *